United States Patent
Thubert et al.

(10) Patent No.: US 11,552,823 B2
(45) Date of Patent: *Jan. 10, 2023

(54) ISOLATION NETWORKS FOR COMPUTER DEVICES

(71) Applicant: Cisco Technology, Inc., San Jose, CA (US)

(72) Inventors: Pascal Thubert, La Colle sur Loup (FR); Jean-Philippe Vasseur, Saint Martin d'uriage (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/796,146

(22) Filed: Feb. 20, 2020

(65) Prior Publication Data
US 2020/0195473 A1 Jun. 18, 2020

Related U.S. Application Data

(63) Continuation of application No. 15/485,673, filed on Apr. 12, 2017, now Pat. No. 10,608,843.

(60) Provisional application No. 62/408,384, filed on Oct. 14, 2016.

(51) Int. Cl.
*H04L 12/46* (2006.01)
*H04L 9/40* (2022.01)
*G06N 20/00* (2019.01)

(52) U.S. Cl.
CPC ......... *H04L 12/4641* (2013.01); *G06N 20/00* (2019.01); *H04L 63/029* (2013.01); *H04L 63/0236* (2013.01); *H04L 63/0272* (2013.01); *H04L 63/1425* (2013.01); *H04L 63/1458* (2013.01)

(58) Field of Classification Search
CPC ............... G06N 20/00; H04L 63/0236; H04L 12/4641
See application file for complete search history.

(56) References Cited

U.S. PATENT DOCUMENTS

| | | | |
|---|---|---|---|
| 8,028,055 | B2 | 9/2011 | Duffield et al. |
| 8,675,488 | B1 | 3/2014 | Sidebottom et al. |
| 8,930,547 | B2 | 1/2015 | Mukkara et al. |
| 9,442,752 | B1 | 9/2016 | Roth et al. |

(Continued)

OTHER PUBLICATIONS

"Cisco 2014 Midyear Security Report", http://www.cisco.com/c/dam/m/en_emear/internet-of-everything-ioe/iac/assets/pdfs/security/securityreport_cisco_v4.pdf, 53 pages, 2014, Cisco.com.

*Primary Examiner* — Hee K Song
(74) *Attorney, Agent, or Firm* — Behmke Innovation Group; James M. Behmke; Jonathon P. Western

(57) ABSTRACT

In one embodiment, a server instructs one or more networking devices in a local area network (LAN) to form a virtual network overlay in the LAN that redirects traffic associated with a particular node in the LAN to the server. The server receives the redirected traffic associated with the particular node. The server trains a machine learning-based behavioral model for the particular node based on the redirected traffic. The server controls whether a particular redirected traffic flow associated with the node in the LAN is sent to a destination of the traffic flow using the trained behavioral model.

20 Claims, 6 Drawing Sheets

(56) References Cited

U.S. PATENT DOCUMENTS

| | | |
|---|---|---|
| 9,450,972 B2 | 9/2016 | Cruz Mota et al. |
| 2008/0262990 A1* | 10/2008 | Kapoor ................ H04L 9/40 706/20 |
| 2011/0231510 A1* | 9/2011 | Korsunsky ............ G06F 21/55 709/213 |
| 2011/0310899 A1* | 12/2011 | Alkhatib ............... H04L 45/74 370/392 |
| 2013/0318594 A1 | 11/2013 | Hoy et al. |
| 2013/0332602 A1* | 12/2013 | Nakil ................... H04L 43/10 709/224 |
| 2015/0089566 A1 | 3/2015 | Chesla |
| 2015/0100560 A1* | 4/2015 | Davie ................... H04L 45/16 707/703 |
| 2015/0124590 A1* | 5/2015 | Chu ...................... H04L 45/74 370/225 |
| 2016/0028557 A1* | 1/2016 | Dong ................ H04L 12/4633 370/395.53 |
| 2016/0057253 A1* | 2/2016 | Zhou .................... H04W 48/16 709/203 |
| 2016/0218991 A1 | 7/2016 | Sharabi et al. |
| 2018/0109606 A1* | 4/2018 | Alpert ............... H04L 12/4641 |
| 2019/0103993 A1 | 4/2019 | Cidon et al. |

* cited by examiner

ISOLATION NETWORKS FOR COMPUTER DEVICES

RELATED APPLICATION

This application is a Continuation Application of U.S. patent application Ser. No. 15/485,673, filed Apr. 12, 2017, which claims priority to U.S. Provisional Patent Appl. No. 62/408,384, filed on Oct. 14, 2016, entitled ISOLATION NETWORKS FOR COMPUTER DEVICES, by Thubert, et al., the contents of which are incorporated herein by reference.

TECHNICAL FIELD

The present disclosure relates generally to computer networks, and, more particularly, to isolation networks for computer devices.

BACKGROUND

A new form of network attack is now taking shape, whereby the Internet of Things (IoT) is used to attack the rest of the world, as opposed to the other way around. For example, a recent distributed denial of service (DDoS) attack exceeded 620 Gbps of brute force login attacks, nearly doubling that of previous peak attacks. While this was one of the largest attacks recorded to date, there are additional factors that set it apart from a "standard DDoS." Most significantly, the attack was generated by a BotNet that was comprised primarily of IoT devices. The majority of these devices were identified as security cameras and digital video records (DVRs) that were used in "Small Office/Home Office" (SoHo) setups. Of particular interest is that the attack included a substantial amount of traffic connecting directly from the BotNet to the target, rather than reflected and/or amplified traffic, as seen in recent large attacks using Network Time Protocol (NTP) and Domain Name System (DNS) vulnerabilities.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
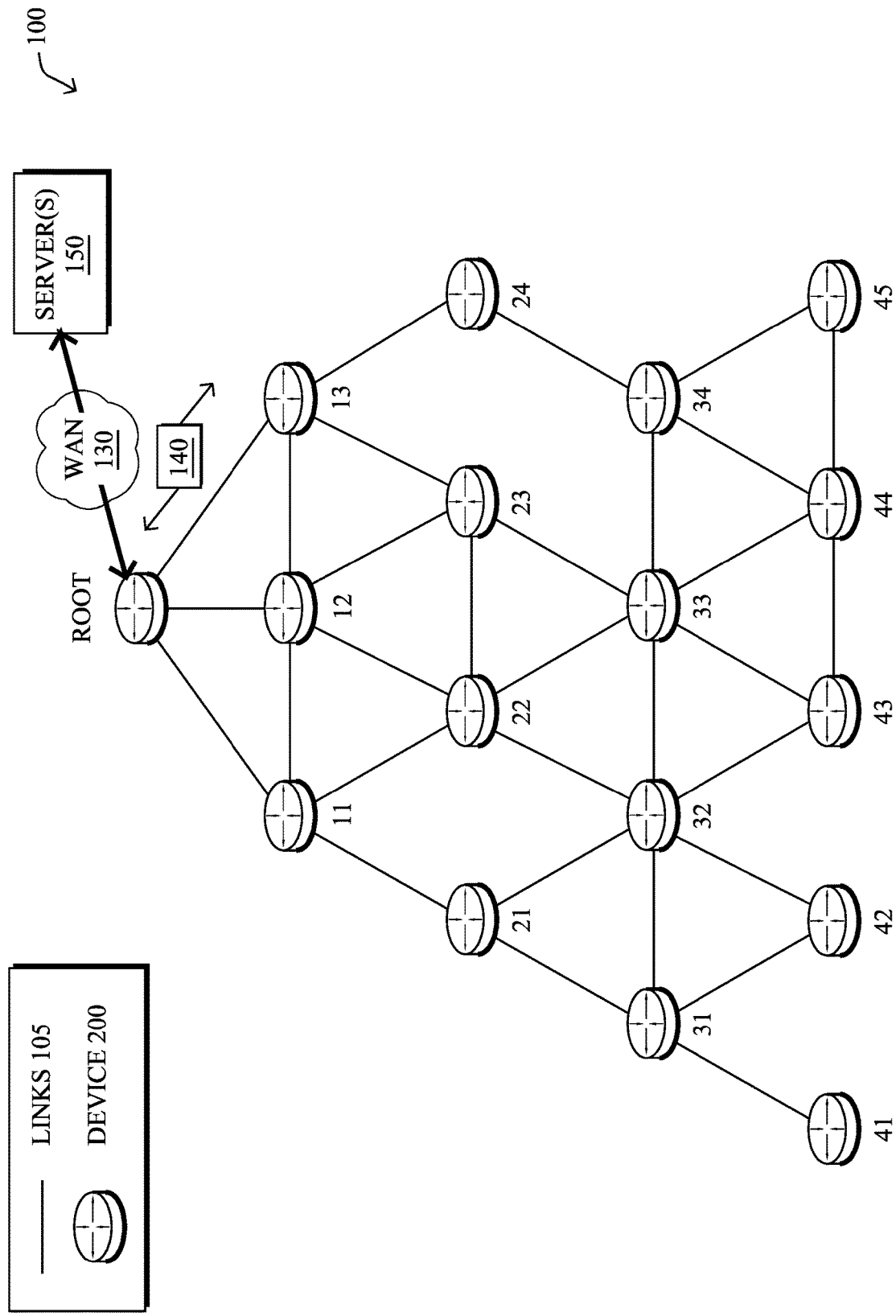
FIG. 1 illustrates an example communication network.

According to one or more embodiments of the disclosure, a server instructs one or more networking devices in a local area network (LAN) to form a virtual network overlay in the LAN that redirects traffic associated with a particular node in the LAN to the server. The server receives the redirected traffic associated with the particular node. The server trains a machine learning-based behavioral model for the particular node based on the redirected traffic. The server controls whether a particular redirected traffic flow associated with the particular node in the LAN is sent to a destination of the traffic flow using the trained behavioral model.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with WAN 130, which may house one or more other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
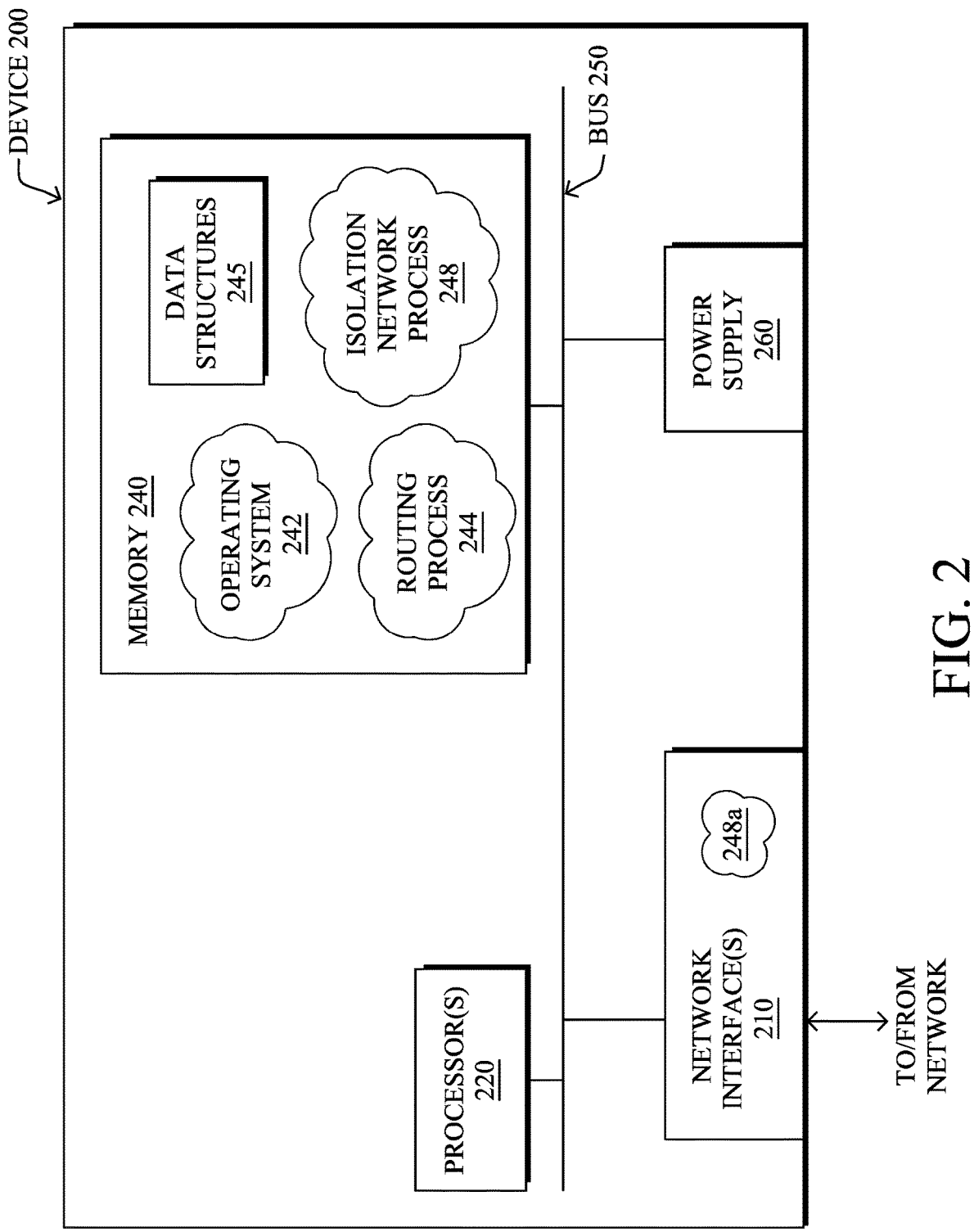
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and an illustrative isolation network process 248, as described herein. Note that while process 248 is shown in centralized memory 240, alternative embodiments provide for the process to be specifically operated within the network interfaces 210, such as a component of a MAC layer (e.g., process 248*a*).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As described in greater detail below, isolation network process 248 may be configured to form an "isolation network" that isolates a given network node from a networking perspective and cause the traffic of the node to be rerouted for analysis (e.g., by process 248). In some cases, isolation network process 248 may use the rerouted traffic to train a machine learning-based behavioral model of the node. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, and c such that the number of misclassified points is minimal. After this optimization/learning phase, experience prediction process 248 can use the model M to classify new data points, such as a new traffic flow associated with the node. Often, M is a statistical model, and the cost function is inversely proportional to the likelihood of M, given the input data.

In various embodiments, isolation network process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic flows that are deemed "suspicious," or "benign." On the other end of the spectrum are unsupervised techniques that do not require a training set of labels. Notably, while a supervised learning model may look for previously seen network data that has been labeled accordingly, an unsupervised model may instead look to whether there are sudden changes in the behavior of the node (e.g., the node suddenly starts attempting a large number of connections to a previously unseen destination, etc.). Semi-supervised learning models take a middle ground approach that uses a greatly reduced set of labeled training data.

Example machine learning techniques that isolation network process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

Security is one of the prime topics of concern for the IoT, and it could become a roadblock for massive adoption if it is not properly addressed. Until now, there were very few attacks which targeted the IoT space, and IoT solutions for security are in fact very minimal (for the most part they are extensions of firewalls with smart device signatures). Not only could the IoT attacks ramp up massively as IoT is being deployed, but their scale could be unprecedented due to the pervasive nature of the deployment, and their complexity could become overwhelming considering the number of protocols involved.

As noted above, a new form of IoT attack is now taking shape, whereby the IoT is used to attack the rest of the world, as opposed to the other way around. For example, a recent distributed denial of service (DDoS) attack exceeded 620 Gbps of brute force login attacks, nearly doubling that of previous peak attacks. While this was one of the largest attacks recorded to date, there are additional factors that set it apart from a "standard DDoS." Most significantly, the attack was generated by a BotNet that was comprised primarily of "Internet of Things" (IoT) devices. The majority of these devices were identified as security cameras and DVRs that were used in "Small Office/Home Office" (SoHo) setups. Of particular interest is that the attack included a substantial amount of traffic connecting directly from the BotNet to the target, rather than reflected and/or amplified traffic, as seen in recent large attacks using NTP and DNS vulnerabilities.

It is worth noting that this example attack was a DDoS attack, whereas a wide range of highly concerning attacks target data leaking or extraction, exposing private data and confidential information with possibly dramatic consequences.

The BotNet in the example above lived on the discrepancy between end-user expectations (e.g., a plug-and-play device) and the actual system they deploy (e.g., a UNIX computer connected to the Internet).

The Internet is facing a widespread problem that lowers user's confidence in IoT, such as where people suddenly discover that anyone can actually see into their home through that very camera they installed for their "protection," without proper security measures and configuration taking place. Effectively, the inside of thousands of homes may be exposed over the Internet, and the next step for burglars could be to effectively use a recommendations engine to select the best house for tonight's robbery.

Notably, certain systems (e.g., a UNIX system as designed for a PC or a server) come with the capability to connect anywhere in the Internet over all sorts of protocols (SSH, HTTP, etc.) in a fashion that looks actually legitimate in the wire. These systems, in particular, often have the capability to open ports in the firewall (STUN, TURN, ICE, etc.), and place severe requirements on the end user, such as forcing frequent updates to cope with newly found vulnerabilities and requiring login management to prevent unwanted parties from accessing the system.

The user expectation is that an IoT device is plug-and-play and largely unmanaged. People do not know or care what a root user is and cannot imagine that their camera can dig gaping holes in their trusted firewall. People also will not think of or know how to upgrade their IoT systems. In fact, upgrades may not even be available from some vendors, which may either have disappeared from the market or may have rapidly lost interest in older systems in order to focus on producing new ones. Furthermore, the sheer volume of IoT devices implies a very quick and easy installation process, commonly at the expense of weaker security (e.g., shared secret, PSK). A number of examples of such trade-offs is already commercially distributed and involves both consumer and professional grade equipment. The average IoT device often comes out-of-the-box with a well-known root password that will never be changed (such as "admin/admin"), is reachable at an easily guessable IP address (e.g., in the 192.168.1.0/24 range), and is loaded with vulnerabilities that are fully documented in the dark web and will never be fixed. Basically, many IoT devices are open doors for hackers over the Internet and are much easier to compromise than a classical PC.

At this time, there are so many IoT devices that can be easily compromised that the attacker does not care whether a particular compromised device is detected. There needs to be no anonymity network (e.g., Tor Project), no redirection complexity, no weird packet construction that can be used to recognize a fraud. The attack comes straight from apparently a plain user, using direct connectivity such as GRE tunnels, for which defenses are not really prepared and which may be a lot harder to sort out from real traffic.

Thus, an untrusted node may be applied in situations where a user has a limited a-priori understanding of the security posture of the device (e.g., vulnerabilities and credentials) and of its behavior, such as, e.g., opening ports for network address translation (NAT) using Universal Plug and Play (UPnP). Furthermore, a user may have no control on the device software, as originally coming out of the box and then also through firmware updates.

An attack on an IoT device may leak private information to the internet, open the private network to attackers, as well as enable an incredibly powerful BotNet. While BotNets may target the higher end of the IoT, such as TVs with hardware for video communication, video surveillance, and baby monitors, Trojan attacks may leverage any device, including bathroom scales, medical care objects, remote controls, etc. to turn the firewall and open NAT ports. Anything connected can become a backdoor to the whole private network.

Isolation Networks for Computer Devices

The techniques herein describe components of an architecture whereby expert systems in a network can help protect users of (IoT) nodes/devices against misuses and leaks and allowing the IoT at large to grow in safe conditions. The architecture herein breaks the ANY-to-ANY paradigm that sustains the present Internet and is well suited to an IoT device that interacts with only a few specific destinations. The present techniques are very efficient, and, rather than adding more devices that may cover only a portion of the attack surface, the architecture herein places an "immune deficient" IoT node into an isolated network or "bubble" that appears as the Internet or Intranet from the device perspective but is in fact highly restricted in connectivity. The isolation network behaviorally controls what the network device really needs and is capable of providing services for the device that a human user will not do (e.g., set root password, configure an upgrade server, connect to desired peers in isolation from the rest of the world, monitor/police behaviors, etc.).

Illustratively, the techniques described herein may be performed by hardware, software, and/or firmware, such as in accordance with isolation network process 248, which may include computer executable instructions executed by processor 220 (or independent processor of interfaces 210) to perform functions relating to the techniques described herein, e.g., in conjunction with routing process 244 or other processes as appropriate. In particular, isolation network process 248 may be a component of an IoT device, a cloud device, or any other participating device for the techniques described herein.

Specifically, according to one or more embodiments of the disclosure, a server instructs one or more networking devices in a local area network (LAN) to form a virtual network overlay in the LAN that redirects traffic associated with a particular node in the LAN to the server. The server receives the redirected traffic associated with the particular node. The server trains a machine learning-based behavioral model for the particular node based on the redirected traffic. The server controls whether a particular redirected traffic flow associated with the particular node in the LAN is sent to a destination of the traffic flow using the trained behavioral model.

Figure 3A:
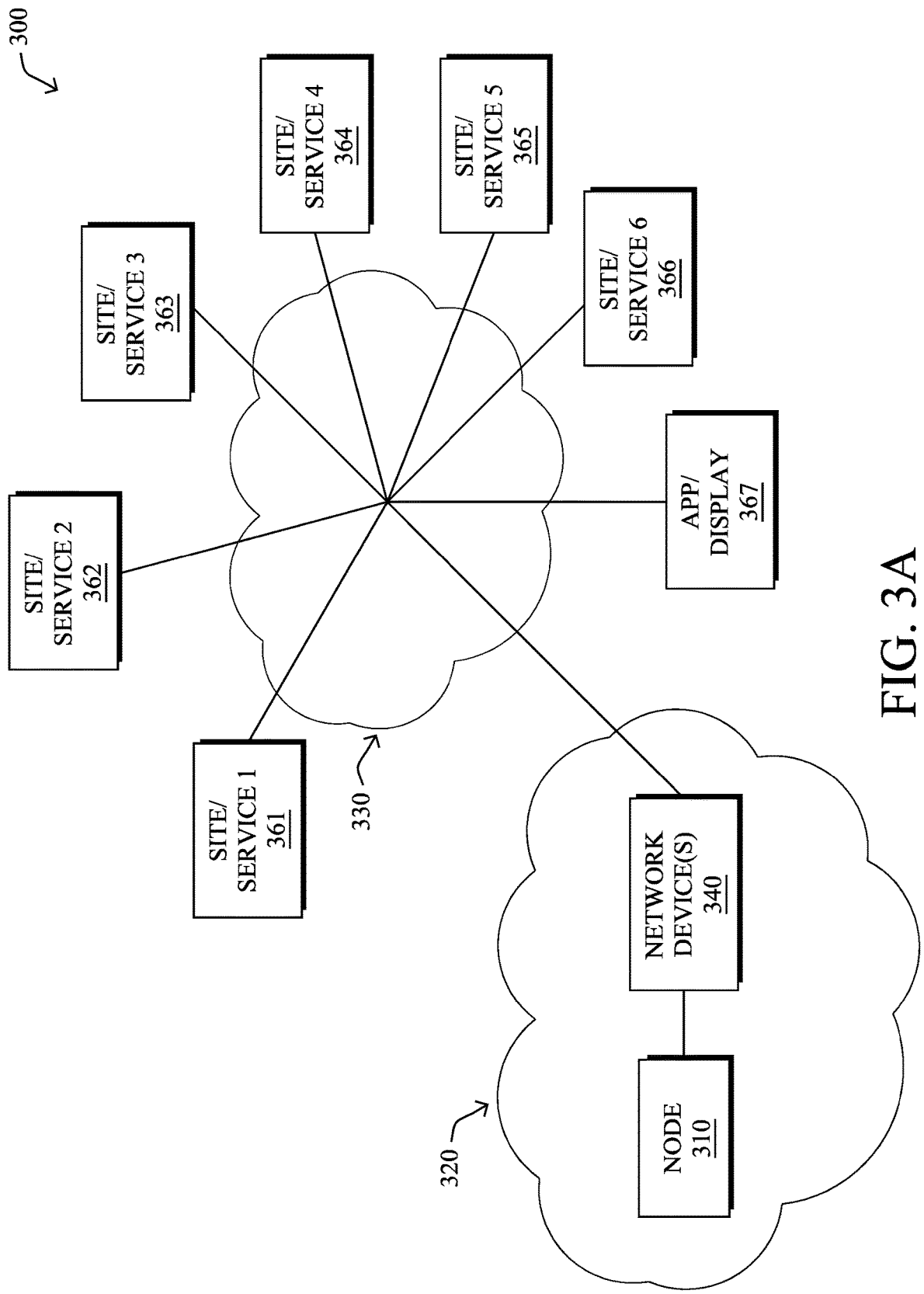
FIGS. 3A-3C illustrate an example isolation network formation.
Figure 3B:
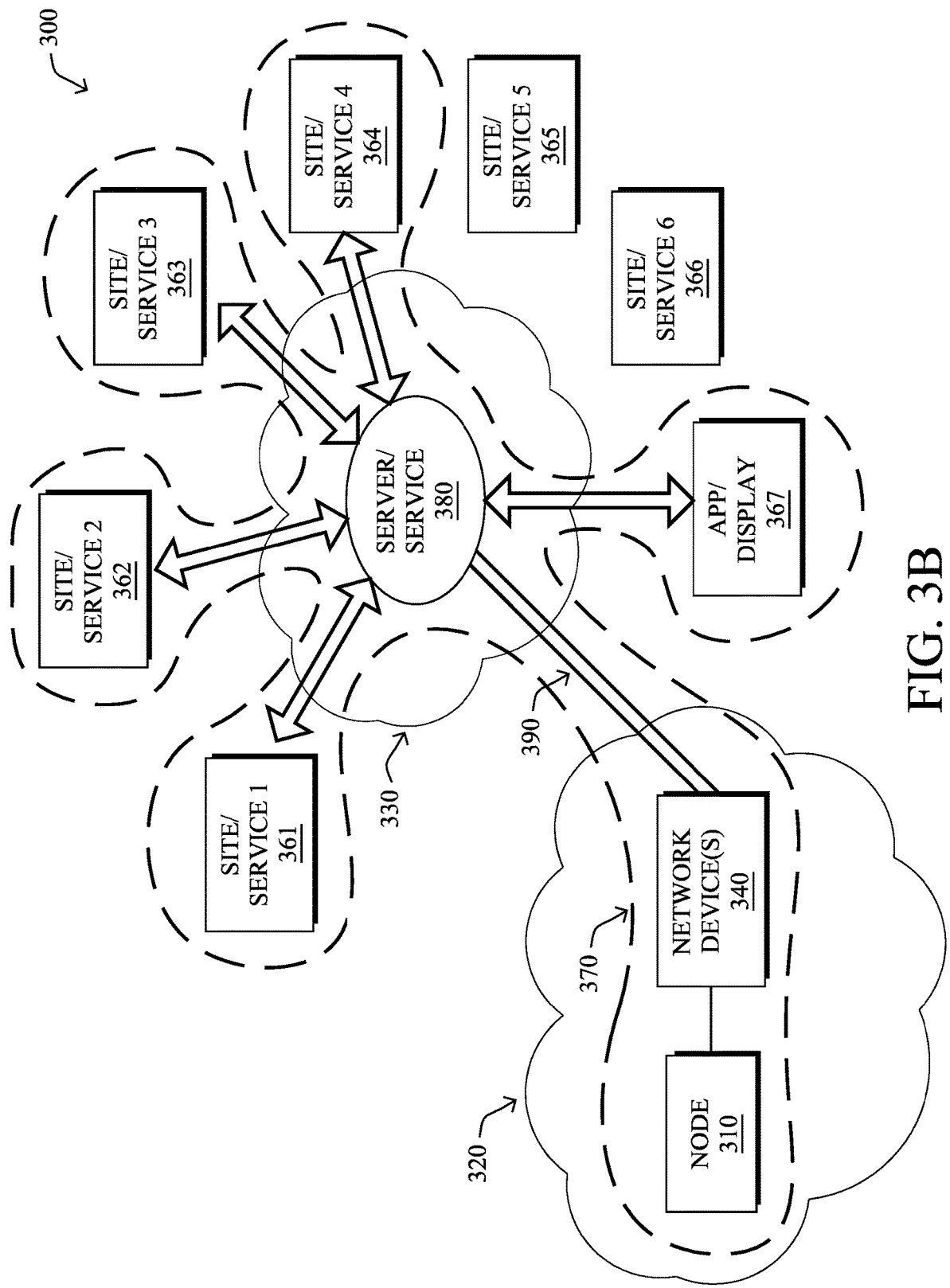
Figure 3C:
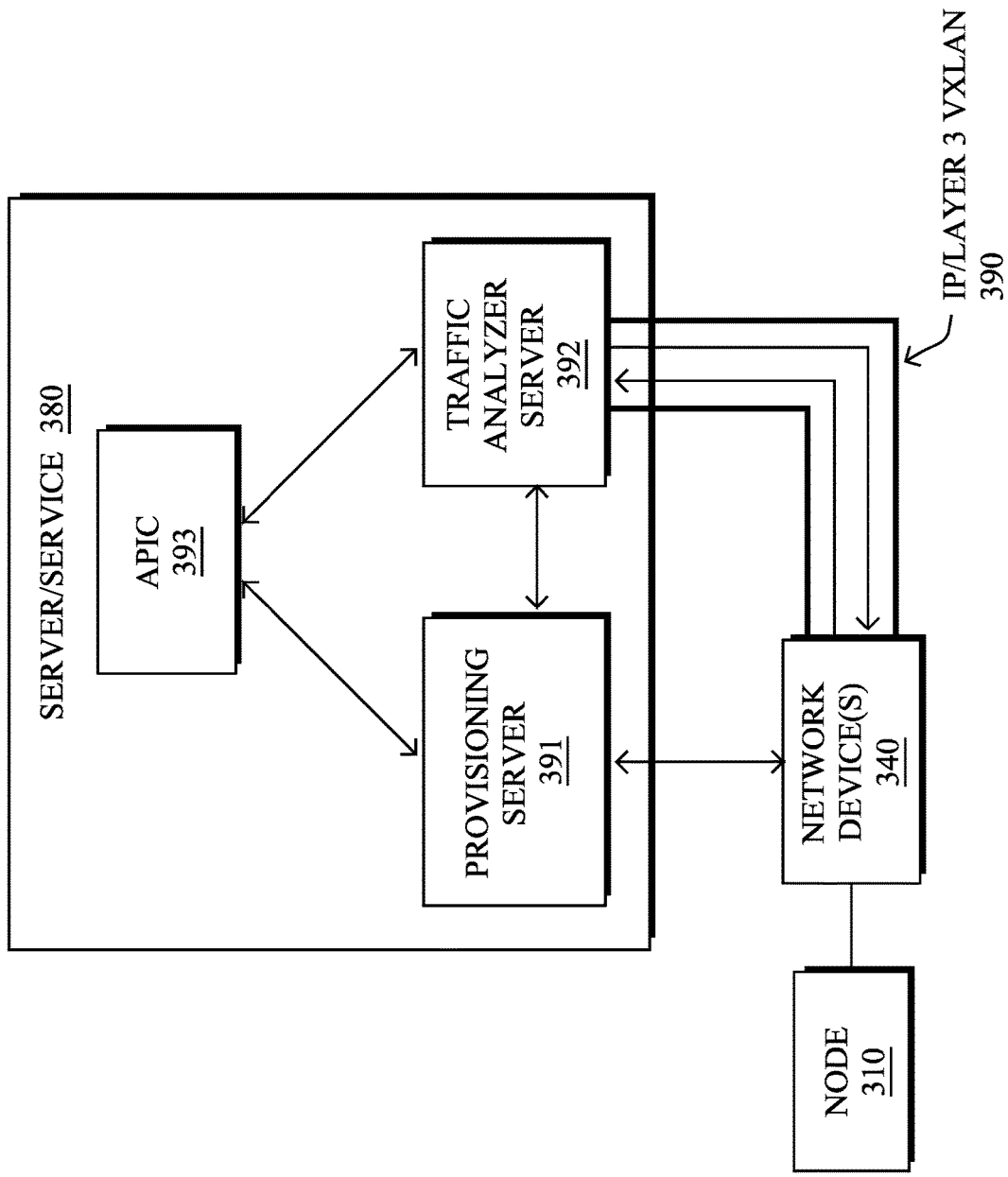

Operationally, FIGS. 3A-3C illustrate an example formation of the overall architecture discussed herein. As shown in FIG. 3A, network 300 comprises an IoT device in a network connecting to various sites, services, and/or applications. In particular, node 310 (e.g., a home or building device including a security camera, a video/audio recording device, a thermostat, a kitchen appliance, a bathroom scale, etc.) in local area network (LAN) 320 (e.g., a home or SoHo LAN or WLAN) may connect to one or more remote destinations outside of LAN 320 (e.g., site/service 1-site/service 6, 361-366, and application/display 367), such as through external network 330 (e.g. a WAN). As shown, node 310 may communicate via one or more networking devices 340 of LAN 320 (e.g., wired or wirelessly) to access the various destination 361-367 and/or other destination nodes within LAN 320. As would be appreciated, networking device(s) 340 may include, but are not limited to, (wireless) access points (APs), switches, routers, a gateway that connects LAN 320 to external network 330, combinations thereof, and the like. In general, node 310 may be able to access a wide variety of different sites and services, some of which may be either unneeded or potentially harmful or dangerous to the device as well as to other devices within its local network. As discussed above, securing the devices within LAN 320, particularly node 310, from attack may become increasingly challenging with such unchecked accesses.

FIG. 3B illustrates a specific embodiment of the present disclosure in which an isolation network is formed in order to provide improved security for node 310. As shown, a server/service 380 in external network 330 may cause the formation of a virtual network overlay that acts as an isolation network 370 for node 310. In the case of cloud-computing environments, multiple devices may be used to provide service 380. In such cases, the term "server" refers to the collective devices operating in conjunction with one another. Isolation network 370 may, in some embodiments, include node 310, the one or more networking devices 340 of LAN 320, as well as one or more destinations with which node 310 is authorized to communicate. For example, sites/services 365-366 are outside of isolation network 370 and, thus, traffic from node 310 to these sites/services would be blocked.

In more detail, in some embodiments, server/service 380 may instruct networking device(s) 340 to bridge/tunnel traffic associated with node 310 to server/service 380 for further analysis. For example, rather than sending a request from node 310 to site/service 361, the gateway of LAN 320 may redirect the traffic via a tunnel to server/service 380 for further analysis. Server 380 could also re-inject the traffic received from node 310 via the networking device(s) 340 back towards the networking device(s), to let it be bridged or routed as initially intended. When doing so, it could provide detailed instructions, embedded into the tunnel header, to instruct the networking device(s) 340 (e.g., a bridge or router), to restrict the way traffic should be bridged or routed.

As an example, assuming the networking device 340 is a switch, it may receive a multicast packet such as a Router Solicit (RS). Normally, the switch would simply broadcast to all nodes. Instead, the RS may be sent to the server 380, server 380 may decide that it should only go to the routers, re-inject the received packet to the switch, but instruct it about the 2 nodes. In turn, when the switch receives the packet, instead of broadcasting, it may only replicate the packet to the two routers.

As part of the formation of isolation network 370, server/service 380 may also generate a unique identifier for the virtual overlay of isolation network 370. For example, server/service 380 may generate and send a unique service set identifier (SSID) to networking device(s) 340, which node 310 can then use to access LAN 320 wirelessly (e.g., via a wireless AP). Similarly, for wired communication (e.g., IEEE Std. 802.15.4), the identifier may be a PAN-ID. When node 310 attempts to communicate outside of LAN 320, a communication may be received at server/service 380 via the virtual overlay of isolation network 370, and a determination may be made by the device whether the destination of the communication is one of the authorized destinations that are within the virtual overlay. The communication may then be sent to the destination if it is determined that it is, in fact, an authorized destination.

As a specific embodiment of the present disclosure, a user may wish to connect a new IoT device (e.g., node 310) to a home/SoHo network (e.g., LAN 320), in order to access various applications, sites, and/or services. Using these applications, sites, and/or services, the user may be able to, for example, visualize his/her weight loss or share videos via a smartphone where visualization of the video is possible, the smartphone being potentially on the home network (e.g., within LAN 320) or roaming on the Internet. Using the techniques herein, the user may browse a page in a bubble care management system (e.g., server/service 380) and may indicate that the IoT device is a new device. Notably, only minimal information about the device may need to be entered, such as device type, an image/picture of the device, or the manufacture's web site, to be recognized by the bubble care management system.

In response to the registration request regarding node 310, server/service 380 may instruct networking device(s) 340 to form a new virtual overlay/"bubble" that may redirect some or all of the traffic associated with node 310 to server/service 380 for further processing. In some embodiments, server/service 380 may spawn a new virtual machine (VM) or container-based application associated with node 310 to specifically handle the traffic associated with node 310. In the case of VM-based implementations, each such application may be executed within its own separately run operating system with its own set of binaries and libraries, with a hypervisor overseeing the execution of each VM. In containerized implementations, however, the operating system itself, the binaries, and/or libraries may be shared across applications as necessary, on server/service 380. According to the techniques described herein, the VM or containerized application of server/service 380 for node 310 may auto-configure an IP prefix, such as an IPv6 unique local address (ULA) or an IPv4 private address, that is forged on the fly for the virtual overlay of isolation network 370.

In some embodiments, such as for a wireless IoT node, server/service 380 may send the unique SSID (e.g., a virtual-SSID) for isolation network 370 to a user, as well as a password, if needed. Server/service 380 may also send this identifier to networking device(s) 340 of LAN 320, instructing these devices to accept a new Wi-Fi device having the established SSID/password. Note that the password may be optional since the SSID may not be exposed by the AP in its beacon, since it is not a real SSID. A similar approach may be taken in the wired case, such as by generating and sending a PAN-ID.

Thus, according to the techniques described herein, the user may enter the virtual SSID and password (if needed) into node 310 as if they were normal Wi-Fi credentials. The networking device(s) 340 (e.g., a wireless AP) may then send a beacon looking for the SSID that was programmed, per normal Wi-Fi behavior. Since this SSID has been communicated to the device AP and/or network gateway, node 310 would therefore be allowed in and associated. The authentication phase based on the SSID/password can be handled either at the device AP or the bubble care VM. For example, in a controller model, the controller may perform the L2TP to the bubble care VM. Traffic from node 310 may, in some embodiments, be encrypted with a particular session key and would not be visible from other devices/nodes which use different keys and network settings.

According to further aspects of the techniques herein, the device (e.g., the bubble care management service) may also instruct networking device(s) 340 to bridge/tunnel (e.g., using L2TP) all the datagrams associated with the SSID to the particular new bubble care VM or container running on server/service 380. In this way, communications between node 310 and server/service 380 may only occur using tunnel 390 within isolation network 370.

Networking devices 340 may bridge some or all of the traffic associated with node 310 to server/service 380, based on an established policy. In some embodiments, server/service 380 may also train a learning machine-based behavioral model for node 310 based on the received traffic associated with node 310. For example, the VM or containerized application that assesses the traffic associated with node 310 may emulate the expected networking device(s) 340 and any other servers or devices (e.g., a DNS server, etc.), from the perspective of node 310. To do so, fields, such as the prefix in a router advertisement, may be filled with the forged ULA/private addresses generated for this virtual overlay. In doing so, the machine learning-based model can "learn" the traffic behaviors associated with node 310.

Since the interaction with the network appears "normal" from the perspective of node 310, node 310 forms or obtains IP addresses and is able to communicate with the Internet via the virtual overlay of isolation network 370, but only if the destination is authorized by server/service 380. For example, note, as shown in FIG. 3B, site/service 5 (365) and site/service 6 (366) are not part of the virtual overlay of isolation network 370 and, as such, would not be accessible to node 310 (e.g., server/service 380 may drop traffic from node 310 to these destinations).

Authorized sites/services may be those that have been determined, based, for example, on the type of node 310, to be necessary (e.g., based on the information regarding node 310 in the registration request), preferable, and/or safe for the device to access. For example, remote sites/services that provide configuration management, software management (such as a vendor support site), security posture management, and/or various data publishers and subscriptions (e.g., YouTube, Google, etc.) may be authorized for inclusion in isolation network 370. Authorization may be based on either a pre-established knowledge base, which may be related to the particular brand/model/type of IoT device, or may be determined from information available related to the device. For example, a particular IoT device model may be permitted to connect to the manufacturer's site for downloading system software or to an application store for resident applications for that particular device. Authorized sites may also be determined based on target site reputation and/or heuristically.

The accessible destinations for node 310 may also be based in part on the behavioral model for node 310. For example, in cases in which the exact type of node 310 is unknown, the behavioral model of server/service 380 may be used to determine the type of node 310 and its authorized destinations. In another embodiment, the model may be used to detect and block anomalous traffic associated with node 310 (e.g., sudden and unexpected increases in traffic, etc.).

As shown in FIG. 3B, communications from node 310 are received at server/service 380 through bridge/tunnel 390 from networking device(s) 340, which helps to implement the virtual overlay of isolation network 370. In this way, node 310 and its communications are protected within isolation network 370 and are only permitted to specified authorized destinations, thereby preventing access to node 310 and protecting LAN 320 from external potential threats. Server/service 380 may either proxy the request or may extend the ULA overlay to include a particular application. As a specific example, if a smartphone is used as a display, an application available on the smartphone may terminate a L3 overlay (e.g., MIPv6 homed at the bubble care VM) that enables mobility. The VM of server/service 380 may monitor the traffic and may bridge what is deemed to be legitimate to the smartphone over the MIPv6 tunnel.

Implementation of such overlay/isolation networks (e.g., a "bubble") as described herein may be dynamic and may bootstrap, isolate, monitor, and manage computer devices, particularly IoT devices, through their lifecycles, thereby addressing one of the key inhibitors of massive IoT deployment. Additionally, isolation networks as described herein may be combined with behavioral analysis, applying the latest approaches to network isolation and mobility under the control of learning machines (e.g., code implementing machine learning algorithms such as behavioral analytics) that may be located in the cloud to benefit from cross learning (e.g., learning from datasets belonging to different networks), though some actions can be delegated locally (e.g., Home Fog).

As described herein in some embodiments, a virtual overlay network (e.g., an isolation network/bubble) may be formed that includes the few logical network devices with which an IoT device primarily needs to communicate and, further, excludes unwanted or unneeded sites/services, such as a BotNet controller (e.g., Command & Control (C2) server) that could either trigger the device if already compromised or could become a potential target that the device would attack if already programmed for attack (e.g., if the device is in the bubble). The virtual overlay described herein may protect the IoT device from remote attackers that would attempt to login to the device and compromise it, whether the attacker is far on the Internet (such as external network 330) or on the same home network (such as LAN 320). The virtual overlay network may also enable transparent connectivity to mobile personal devices such as an application/display in a smartphone.

As an intelligent protection, the isolation network (e.g., the virtual overlay network) may leverage rule-based and machine learning (ML) approaches. These techniques may be used to profile the device to determine its type, so as to derive appropriate management techniques (e.g., http html page on poor 80 in the device) and the needs for connectivity. Furthermore, the flows from/to the devices may thereby be validated and misbehaviors detected. In addition, appropriate connections to Internet services may be allowed (e.g., software upgrade, publish/subscribe servers, management, etc.) inside the virtual overlay and, in some embodiments, multiple local devices may be allowed inside the same "bubble" with the capability to either monitor or intercept the traffic at some intelligence point in the cloud or to let the traffic flow locally with no data flowing outside of the device network (e.g., a LAN or WLAN). Rule-based and ML approaches may also be used to generate and push a configuration for the device that is adapted to the device type, including dedicated home SSIDs and passwords, root passwords, management servers and passwords, URL of support servers such as software update, etc., all based on simple user input, device profiling, and potential policy rules learned for the device profile. Furthermore, a set of rules may be generated and pushed to the first hop the device connects to (e.g., a device AP, a gateway, etc.) to allow and control shortcutting of specific flows between specific devices. Web pages that have never been seen can be understood, recognizing fields and generating filled forms automatically.

In some embodiments, the techniques described herein are based on the particular mechanisms that may allow formation of a virtual overlay to isolate a device in a local network (e.g., an IoT device), to extend the virtual overlay to the cloud by creating a bubble care instance in the cloud, and to bridge the device traffic to the bubble care instance. The techniques may leverage learning machines (e.g., combination of rules and machine learning algorithms) to emulate the interactions with routers from the bubble care instance so the device starts normal L2/L3 activity. Said differently, the techniques described herein may use newly defined learning machine based mechanisms to isolate devices from the surrounding networks (e.g., LAN and the Internet), install the device in a virtual network (e.g., an isolation network) that is overlaid over the Internet, where the virtual network incorporates a "bubble care cloud" application that controls the connectivity of the device. Thus, in some embodiments, the techniques herein may provide full isolation of each device and the bridging to a virtual machine in the cloud on the fly, wherein the virtual machine may use artificial intelligence technology to respond to the device faking the required set of network devices.

FIG. 3C illustrates an example embodiment showing one potential implementation of server/service 380 in greater detail, according to various embodiments. As noted above, server/service 380 may comprise a single server or, alternatively as shown, several servers that operate in conjunction with one another to implement the techniques herein as part of a single remote service for the nodes in LAN 320.

In some embodiments, server/service 380 may comprise a provisioning server 391 and a traffic analyzer server 392. During operation, provisioning server 391 may instruct networking device(s) 340 to form a specific bubble/virtual overlay for one or more nodes in LAN 340 (e.g., isolation network 370). For example, provisioning server 391 may be an Identity Services Engine (ISE) from Cisco Systems, Inc., or similar server that performs the provisioning (e.g., based on the profile of node 310). In doing so, provisioning server 391 may instruct networking device(s) 340 to form a Layer 3. Virtual Extensible LAN (VXLAN) that directs traffic associated with node 310 to a traffic analysis server 392 for analysis.

During establishment of isolation network 370, provisioning server 391 may also instruct traffic analyzer server 392 to perform any number of functions on the traffic associated with node 310. For example, depending on the profile of node 310, provisioning server 391 may instruct traffic analyzer server 392 to perform firewall functions on the traffic, perform machine learning-based modeling of the traffic, or the like. In some embodiments, provisioning server 391 may instruct traffic analyzer server 392 to execute these functions within a VM or container associated with the specific isolation network 370.

In some cases, Application Policy Infrastructure Controller (APIC) 393 in server/service 390 may also provide application user group information to provisioning server 391 and/or to traffic analyzer server 392. Such information may be used by server 391-392 to help control the provisioning of isolation network 370 and/or the specific functions performed on the traffic by traffic analyzer server 392.

Figure 4:
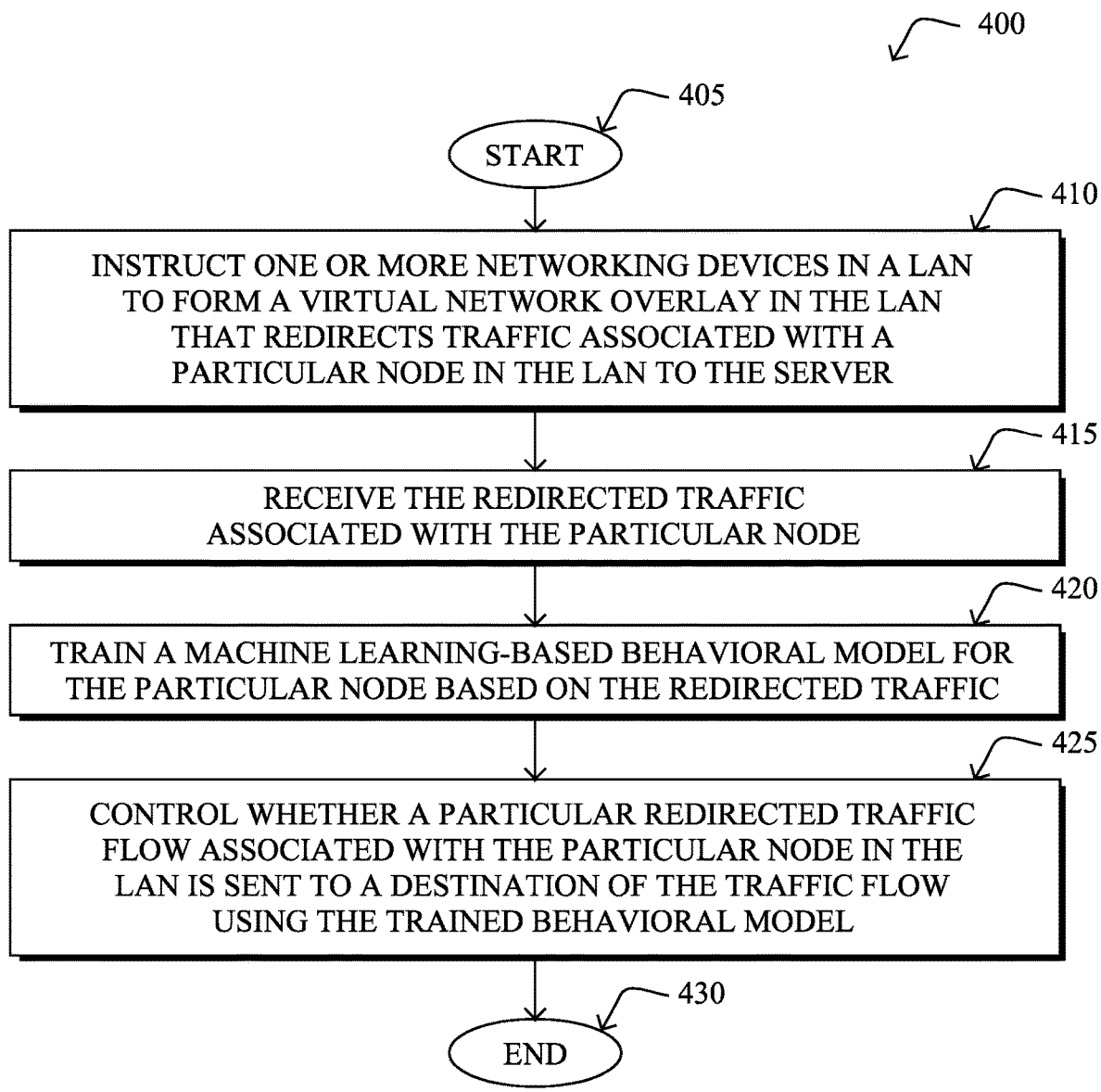
FIG. 4 illustrates an example simplified procedure for forming an isolation network.

FIG. 4 illustrates an example simplified procedure for forming an isolation network in accordance with one or more embodiments of the techniques described herein. For example, a non-generic, specifically configured device in a network (e.g., device 200) may perform procedure 400 by executing stored instructions. Procedure 400 may start at step 405 and continue to step 410 where, as described in more detail above, the server may instruct one or more networking device in a local area network (LAN) to form a virtual network overlay in the LAN that redirects traffic associated with a particular node in the LAN to the server. The virtual network overlay may act as an isolation network and may, in some embodiments, include the particular node in the LAN, the one or more networking devices of the LAN, and one or more destinations with which the particular node is authorized to communicate.

At step 415, as described in more detail above, the server may receive the redirected traffic associated with the particular node. The traffic may be wired or wireless communication. In some embodiments, the node may be an IoT device communicating via one or more networking devices of the LAN, such as a wireless access point, switch, router, gateway, or combinations thereof.

At step 420, as described in more detail above, the server may train a machine learning-based behavioral model for the particular node based on the redirected traffic. In some embodiments, the model may be used to determine the type of node as well as determine one or more authorized destinations for the particular node. The model may also be used to detect and block traffic associated with the node that is determined to be anomalous.

At step 425, as described in more detail above, the server may control whether a particular redirected traffic flow associated with the particular node in the LAN is sent to a destination of the traffic flow using the trained behavioral model. For example, in some embodiments, traffic flow between the particular node in the LAN and the server may occur using a tunnel within the isolation network. The server may instruct a networking device in the LAN to bridge/tunnel the redirected traffic to the server for further analysis rather than to send the communication directly to the destination. If the destination is one with which the particular node is authorized to communicate, the particular redirected traffic flow may be sent to the destination. Procedure 400 may then end at step 430.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for isolation networks and related techniques, it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, other suitable protocols may be used, accordingly.

The foregoing description has been directed to specific embodiments. It will be apparent however that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
instructing, by a server, one or more networking devices in a local area network (LAN) to form a virtual network overlay in the LAN that redirects traffic associated with a particular node in the LAN to the server, wherein the virtual network overlay forms an isolation network that blocks traffic from the particular node to servers other than the server;
receiving, at the server, the redirected traffic associated with the particular node;
training, by the server, a machine learning-based behavioral model for the particular node based on the redirected traffic; and
controlling, by the server, whether a particular redirected traffic flow associated with the particular node in the LAN is sent to a destination of the traffic flow using the trained behavioral model.

2. The method of claim 1, wherein the virtual network overlay comprises a tunnel from one of the networking devices in the LAN to the server.

3. The method of claim 1, wherein the training machine learning-based behavioral model for the particular node based on the redirected traffic comprises:
emulating, by the server, the one or more networking devices in the LAN to process the redirected traffic.

4. The method of claim 1, wherein instructing the one or more networking devices in the LAN to form a virtual network overlay in the LAN that redirects the traffic associated with the particular node in the LAN to the server comprises:
sending, by the server, an Internet Protocol (IP) prefix to the one or more networking devices, wherein the IP prefix is an IPv4 private address or IPv6 unique local address (ULA).

5. The method of claim 1, further comprising:
generating, by the server, a unique service set identifier (SSID) associated with the virtual network overlay for the particular node; and
sending, by the server, the unique SSID to at least one of the one or more networking devices in the LAN, wherein the node uses the unique SSID to access the LAN.

6. The method of claim 1, further comprising:
receiving, at the server, a registration request for the particular node to join the LAN that includes node information comprising one or more of: a node type of the particular node, a manufacturer or vendor of the particular node, or an image of the particular node.

7. The method of claim 6, wherein the server controls whether the particular redirected traffic flow associated with the node in the LAN is sent to the destination of the traffic flow based further in part on the received node information.

8. The method of claim 1, further comprising:
performing, by the device, the receiving, training, and controlling within a virtual machine or container associated with the particular node.

9. The method of claim 1, wherein the destination of the traffic flow is located within the LAN.

10. An apparatus comprising:
one or more network interfaces to communicate with a network;
a processor coupled to the network interfaces and configured to execute one or more processes; and
a memory configured to store a process executable by the processor, the process when executed configured to:
instruct one or more networking devices in a local area network (LAN) to form a virtual network overlay in the LAN that redirects traffic associated with a particular node in the LAN to the apparatus, wherein the virtual network overlay forms an isolation network that blocks traffic from the particular node to servers other than the server;
receive the redirected traffic associated with the particular node;
train a machine learning-based behavioral model for the particular node based on the redirected traffic; and
control whether a particular redirected traffic flow associated with the node in the LAN is sent to a destination of the traffic flow using the trained behavioral model.

11. The apparatus of claim 10, wherein the virtual network overlay comprises a tunnel from one of the networking devices in the LAN to the server.

12. The apparatus of claim 10, wherein the apparatus trains the machine learning-based behavioral model for the particular node based on the redirected traffic by:
emulating the one or more networking devices in the LAN to process the redirected traffic.

13. The apparatus of claim 10, wherein the apparatus instructs the one or more networking devices in the LAN to form a virtual network overlay in the LAN that redirects the traffic associated with the particular node in the LAN to the server by:
sending an Internet Protocol (IP) prefix to the one or more networking devices, wherein the IP prefix is an IPv4 private address or IPv6 unique local address (ULA).

14. The apparatus as in claim 10, wherein the process when executed is further configured to:
generate a unique service set identifier (SSID) associated with the virtual network overlay for the particular node; and
send the unique SSID to at least one of the one or more networking devices in the LAN, wherein the node uses the unique SSID to access the LAN.

15. The apparatus as in claim 10, wherein the process when executed is further configured to:
receive a registration request for the particular node to join the LAN that includes node information comprising one or more of: a node type of the particular node, a manufacturer or vendor of the particular node, or an image of the particular node.

16. The apparatus of claim 15, wherein the apparatus controls whether the particular redirected traffic flow associated with the node in the LAN is sent to the destination of the traffic flow based further in part on the received node information.

17. The apparatus of claim 15, wherein the process is executed within a virtual machine or container.

18. The apparatus of claim 15, wherein the destination is located within the LAN.

19. A tangible, non-transitory, computer-readable media having software encoded thereon, the software when executed by a processor of a server configured to:
instruct one or more networking devices in a local area network (LAN) to form a virtual network overlay in the LAN that redirects traffic associated with a particular node in the LAN to the server, wherein the virtual network overlay forms an isolation network that blocks traffic from the particular node to servers other than the server;
receive the redirected traffic associated with the particular node;

train a machine learning-based behavioral model for the particular node based on the redirected traffic; and control whether a particular redirected traffic flow associated with the node in the LAN is sent to a destination of the traffic flow using the trained behavioral model.

20. The computer-readable media of claim 19, wherein the virtual network overlay comprises a tunnel from one of the networking devices in the LAN to the server.

\* \* \* \* \*

UNITED STATES PATENT AND TRADEMARK OFFICE
CERTIFICATE OF CORRECTION

PATENT NO. : 11,552,823 B2
APPLICATION NO. : 16/796146
DATED : January 10, 2023
INVENTOR(S) : Pascal Thubert et al.

It is certified that error appears in the above-identified patent and that said Letters Patent is hereby corrected as shown below:

In the Specification

Column 13, Line 34, please amend as shown:
3 Virtual Extensible LAN (VXLAN) that directs traffic Signed and Sealed this
Fourth Day of April, 2023

Katherine Kelly Vidal
*Director of the United States Patent and Trademark Office*